US006673737B2

(12) United States Patent
Mehnert et al.

(10) Patent No.: US 6,673,737 B2
(45) Date of Patent: Jan. 6, 2004

(54) IONIC LIQUID COMPOSITIONS

(75) Inventors: Christian Peter Mehnert, Clinton, NJ (US); Raymond Arnold Cook, Bethleham, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 187 days.

(21) Appl. No.: 09/922,320

(22) Filed: Aug. 3, 2001

(65) Prior Publication Data

US 2002/0198100 A1 Dec. 26, 2002

Related U.S. Application Data

(60) Provisional application No. 60/294,366, filed on May 30, 2001.

(51) Int. Cl.[7] .................................................. B01J 31/00
(52) U.S. Cl. ....................................................... 502/159
(58) Field of Search ........................................ 502/159

(56) References Cited

U.S. PATENT DOCUMENTS

| | | | | |
|---|---|---|---|---|
| 3,855,307 A | * | 12/1974 | Rony et al. | 568/454 |
| 5,599,761 A | | 2/1997 | Turner | 502/152 |
| 5,693,585 A | | 12/1997 | Benazzi et al. | 502/231 |
| 6,355,592 B1 | * | 3/2002 | Hlatky et al. | 502/103 |
| 6,355,746 B1 | * | 3/2002 | Tagge et al. | 526/133 |
| 6,395,671 B2 | * | 5/2002 | LaPointe | 502/150 |
| 6,440,745 B1 | * | 8/2002 | Weinberg et al. | 436/37 |

FOREIGN PATENT DOCUMENTS

| | | | |
|---|---|---|---|
| EP | 0553009 B1 | 6/1997 | ............ B01J/31/02 |
| EP | 1120159 A1 | 8/2001 | ............ B01H/31/02 |
| WO | WO99/03163 | 1/1999 | ............ H01M/6/30 |
| WO | WO00/15593 | 3/2000 | ............ C07C/45/49 |
| WO | WO00/15594 | 3/2000 | ............ C07C/45/49 |
| WO | WO00/32572 | 6/2000 | ......... C07D/213/00 |
| WO | WO01/32308 A1 | 5/2001 | ............ B01J/31/02 |

OTHER PUBLICATIONS

"Ionic Liquids–New "Solutions" for Transition Metal Catalysis"; Peter Wasserscheid and Wilhelm Keim; Institut für Technische Chemie und Makromolekulare Chemie der RWTH Aachen Worringerweg 1, 52074 Aachen, Germany; Angew. Chem. Int. Ed. 2000, 39, pp3772–3789.
"Examination of Ionic Liquids and Their Interaction with Molecules, When Used as Stationary Phases in Gas Chromatography", Daniel W. Armstrong, Lingfeng He, and Yan–Song Liu, University of Missouri–Rolla; Analytical Chemistry, American Chemical Society; pp. A–D.
"Immobilized Ionic Liquids as Lewis Acid Catalysts for the Alkylation of Aromatic Compounds with Dodecene"; C. DeCastro, E. Sauvage, M. H. Valkenberg, and W. F. Hölderich; Department of Chemical Technology and Heterogeneous Catalysis, University of Technology–RWTH–Aachen, Worringerweg 1, 52074 Aachen, Germany; Journal of Catalysis, 196, pp. 86–94 (2000).
"Catalytic Hydrogenation Using Supported Ionic Liquid Membranes"; Tae H. Cho, Joan Fuller, and Richard T. Carlin; High Temp. Material Processes, 2 (1998) pp. 543–558.
"Catalytic Immobilized Ionic Liquid Membranes", Richard T. Carlin, Tae H. Cho, Joan Fuller; Electrochemical Society Proceedings, vol. 98–11; pp. 180–186.
"Heterogeneous Catalytic Hydrogenation with Supported Ionic Liquid Membranes", Richard T. Carlin, Tae H. Cho, Joan Fuler; Electrochemical Society Proceedings, vol. 99–41; pp. 20–26.
"Novel Lewis–Acidic Catalysts (NLACs) by Immobilization of IONIC LIQUIDS Their Characterization and Catalytic Performance", W. F. Hölderich and Michael H. Valkenberg, University of Technology, RWTH Aachen, Germany; International Symposium on Acid–Base Catalysis # IV, Matsuyama, Japan, May 7–12, 2001 (1 page).
"Supported Liquid Organochloroaluminates: A. Novel Class of Solid Acid Catalysts for Butene Alkylation with Isobutane", E. Benazzi, H. Olivier, Y. Chauvin, J. F. Joly and A. Hirschauer; Institut Francais du Petrole, Rueil–Malmaison, 02506, France; Book of Abstracts, 212th ACS National Meeting, Orlando, Florida, Aug. 25–29, (1996), PETR–045; Publisher: American Chemical Society, Washington, D.C. (Abstract).
"Hydrodechlorination of C(1)– and (C2)–Chlorocarbons by Supported Molten Salt and Conventional Heterogeneous Catalysts", Akhtar Mumtaz; Univ. of Iowa, Iowa City, Iowa; Diss. Abstr. Int., B 1997, 57 (12), 7518 (1996) 219 pp. Avail: Univ. Microfilms Int., Order No. DA9715112. (Abstract).
"Asymmetric Hydrogenation of 1–Arylacrylic Acids Catalyzed by Immobilized Ru–BINAP Complex in 1–Butyl–3–Methylimidazolium Tetrafluoroborate Molten Salt", Adriano L. Monteiro; Fabiano K. Zinn; Roberto F. De Souza; Jairton Dupont; Grupo De Catalise, Instituto de Quimica, Universidade Federal do Rio Grande do Sul, Porto Alegre, 91501–970, Brazil; Tetrahedron: Asymmetry (1997), 8 (2), pp. 177–179. (Abstract).

\* cited by examiner

Primary Examiner—Mark L. Bell
Assistant Examiner—Jennine Brown
(74) Attorney, Agent, or Firm—Estelle C. Bakun; Joseph C. Wang

(57) ABSTRACT

A novel supported ionic liquid moiety which may further comprise immobilized ionic fluids and catalytic material is described. A method for making the composition is also described.

15 Claims, No Drawings

IONIC LIQUID COMPOSITIONS

This application claims the benefit of U.S. Provisional Application No. 60/294,366 filed May 30, 2001.

FIELD OF THE INVENTION

The invention includes a compositions of matter comprising a composition of the formula $A^+B^-$ covalently bonded to a support, a composition comprising supported $A^+B^-$ and an ionic liquid immobilized in said supported $A^+B^-$ as well as a composition comprising supported $A^+B^-$ having an ionic liquid immobilized in said supported $A^+B^-$ and further having catalyst immobilized in the ionic liquid. Methods for making the compositions are also taught.

BACKGROUND OF THE PRIOR ART

The art proposes $AlCl_x$ based ionic liquids deposited or impregnated onto a solid. For example, EP 553,009 B1 proposes a "catalyst comprising an organic or mineral porous support and at least one mixture constituted by at least one halide of a compound chosen from Aluminum and Boron and at least one compound chosen from ammonium halides and amine hydrohalides.

U.S. Pat. No. 5,693,585 proposes a catalyst composition containing a porous organic or mineral support, preferably silica, and at least one active phase containing at least one aluminum halide, at least one quaternary ammonium halide and/or at least one amine hydrohalide, and at least one cuprous compound.

WO 99/03163 proposes the alkylation of aromatic compounds using as a catalyst a supported ionic liquid composition. The catalyst comprises an ionic liquid, which consists essentially of an organic base and a metal halide, and a support that may be a macroporous polymer or metal oxide, such as silica.

WO 00/15594 proposes a process for the carbonylation of alkyl aromatic compounds using acidic ionic liquids.

Immobilized Ionic Liquids as Lewis Acid Catalysts for the Alkylation of Aromatic Compounds with Dodecene by DeCastro et al., *J. Catalysis* 196, 86–94 (2000) teaches immobilized ionic liquids as Lewis Acid catalysts for the alkylation of aromatic compounds with dodecene. The ionic liquid used throughout the experiments consisted of 1-butyl-3-methylimidazolium chloride and $AlCl_3$. The support materials that were used included $SiO_2$, $Al_2O_3$, $TiO_2$, $ZrO_2$ and some mixtures of thereof.

SUMMARY OF THE INVENTION

The invention includes a composition comprising a support selected from the group consisting of organic and inorganic supports and a composition of the formula $$A^{\oplus}B^{\ominus}$$

wherein A is selected from the group consisting of compounds of the general formulae:

$(ZSiR')_xR_{(2-x)}N=CR_2$, $R_2N=CR_{(2-x)}(R'SiZ)_x$,

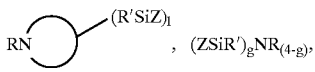, 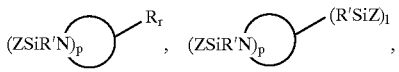,

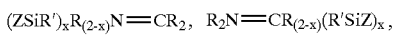, $(ZSiR')_gPR_{(4-g)}$, $(ZSiR')_xR_{(2-x)}N=CR_{(2-y)}(R'SiZ)_y$, and

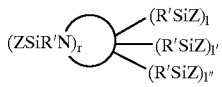

and wherein each occurrence of Z is independently selected from the formula $(Y)_n X_m$ where Y is OR or R and wherein X is halide and wherein p is an integer from 1 to 4, r is an integer from 0 to 10, 1, 1' and 1" are integers from 0 to 4 wherein $1+1'+1''+p \leq 4$ n+m=3 and wherein n ranges from 0 to 3 and m ranges from 0 to 3 and wherein said cyclic systems (depicted by circles) contain 4 to 10 atom in addition to one or more nitrogen atoms, and may also contain sulfur or oxygen atoms singly or double bonded to said ring and wherein said cyclic system may be a single, double or triple ring system and wherein $B^-$ is selected from the group consisting of salts, anions, alkylates and halogenated salts of the Group Ib, IIIb, IVb, Vb, VIb, VIIb, IIIa, IVa, Va, VIa, VIIa, and VIIIa elements of the periodic table (see *Basic Inorganic Chemistry*, by Cotton and Wilkinson, 1976, Wiley, inside cover) and wherein g is an integer from 1 to 4, x is 1 or 2 and y is 1 or 2, wherein each R in the above formulae is independently selected from the group consisting of hydrogen, alkyl, aryl, cycloalkyl, aralkyl, halogenated alkyl, halogenated aryl, halogenated aralkyl, halogenated aralkyl, oxygen, nitrogen, or sulfur substituted alkyl, oxygen, nitrogen or sulfur substituted aryl, oxygen, nitrogen or sulfur substituted aralkyl, oxygen, nitrogen or sulfur substituted cycloalkyl groups having from 1 to 12 carbon atoms and mixtures thereof, and wherein each R' in the above formulae is independently selected from the group consisting of alkyl, aryl, cycloalkyl, aralkyl, halogenated alkyl, halogenated aryl, halogenated aralkyl, halogenated aralkyl, oxygen, nitrogen, or sulfur substituted alkyl, oxygen, nitrogen or sulfur substituted aryl, oxygen, nitrogen or sulfur substituted aralkyl, oxygen, nitrogen or sulfur substituted cycloalkyl groups having from 1 to 12 carbon atoms and mixtures thereof, and wherein said compound having the formulae $A^+B^-$ is covalently bonded to said support through said $A^+$ group.

The invention further includes a composition comprising a support selected from organic and inorganic supports having covalently bonded thereon said composition $A^+B^-$ described above, wherein said composition is covalently bonded to said support through $A^+$ and an ionic liquid coulombically attached to said support.

The invention further includes a composition comprising a support selected from organic and inorganic supports having covalently bonded thereon said composition $A^+B^-$ described above, wherein said composition is covalently bonded to said support through $B^-$ and an ionic liquid coulombically attached to said support and an effective amount of a catalyst immobilized within said ionic liquid.

One skilled in the art can readily determine if the composition $A^+B^-$ has been covalently bonded to the support by utilizing solid state NMR and solid state FTIR techniques to monitor the bonding.

A method of preparing a supported composition comprising;
covalently bonding a compound having the formula $A^+B^-$ to a support selected from organic and inorganic supports, wherein said composition $A^+B^-$ is covalently bonded to said support through $A^+$ and wherein said composition $A^+B^-$ has the formulae shown above and wherein said covalent bond is established through a chemical reaction between said support and said compound said chemical reaction being selected from the group consisting of condensation reactions, ring opening reactions, and hydrosilylation reactions which take place between said composition $A^+B^-$ and said support.

The method may further comprise depositing an ionic liquid dissolved in a solvent onto said support and thereafter evaporating said solvent.

The method may still further comprise adding a catalytically active material to the composition by adding the catalytic material to said solvent along with said ionic liquid or adding a catalytic material to the composition by dissolving the catalyst in a solvent, mixing with the composition and thereafter evaporating off the solvent. The catalyst can be added prior to, following, or in conjunction with the ionic liquid.

DETAILED DESCRIPTION OF THE INVENTION

The composition $A^+B^-$ may be referred to herein as an ionic liquid moiety or a modified ionic liquid. The composition is prepared by mixing and refluxing precursors compounds which when reacted will yield the composition $A^+B^-$. For example an alkylating electrophile may be refluxed with a neutral nitrogen containing compound having at least one silicon based anchor group. Such silicon based anchor groups are Si-halogen or Si-alkoxy groups or mixture thereof. Alternatively, one could reflux a neutral nitrogen containing compound having a lone electron pair on the nitrogen atom with an electrophile having a silicon based anchor group. Such reactions and precursors are easily selected by the skilled artisan with the teaching herein.

Alkylating electrophiles include, for example, butyl chloride, ethyl chloride, hexyl chloride, and methyl triflate.

Neutral nitrogen containing compounds which have silicon based anchor groups include, for example, N-(3-triethoxysilylpropyl)-4,5-dihydroimidazole.

Neutral nitrogen containing compounds having a lone electron pair on the nitrogen include, for example, imidazoles, pyrazoles, thiazoles, isothiazoles, azathiozoles, oxothiazoles, oxazines, oxazolines, oxazoboroles, dithiozoles, triazoles, selenozoles, oxaphospholes, pyrroles, boroles, furans, thiophenes, phospholes, pentazoles, indoles, indolines, oxazoles, isooxazoles, isotriazoles, tetrazoles, benzofurans, dibenzofurans, benzothiophenes, dibenzothiophenes, thiadiazoles, pyridines, pyrimidines, pyrazines, pyridazines, piperazines, piperidines, morpholenes, pyrans, annolines, phthalzines, quinazolines, quinoxalines, quinolines, isoquinolines, thazines, oxazines, and azaannulenes. In addition acyclic organic systems are also suitable. Examples include, but are not limited to amines (including amidines, imines, guanidines), phosphines (including phosphinimines), arsines, stibines, ethers, thioethers, selenoethers and mixtures of the above.

Electrophiles having a silicon based anchor group include for example, 3-triethoxysilylpropyl-1-chloride.

The precursors for $B^-$ include for example, salts, alkylates and halogenated salts of the Group Ib, IIIb, IVb, Vb, VIb, and VIIb elements of the periodic table including borates, phosphates, nitrates, sulfates, triflates, halogenated aluminates, halogenated copperates, antimonates, galleates, alkylates aluminates, phosphates, phosphites, substituted and unsubstitted carboranes, poly-oxo metallates, substitutes (fluorinated, alkylated, and arylated) and unsubstituted metalloboranes, substituted and unsubstituted carboxylates and triflates and mixtures thereof. $B^-$ may also be a non-coordinating anion such as tetra[pentafluoro phenyl]borane. Examples of some of the above include $Al_2Cl_7^-$, $Cl^-$, $BF_4^-$, $PF_6^-$, $AlCl_4^-$, or a metal organic anion.

Thus, in the final composition $A^+B^-$, $B^-$ will be, for example $BF_4^-$, $PF_6^-$, $NO_3^-$, $Cl^-$, halogen$^-$, $CF_3SO_3^-$, $CF_3COO^-$, $AlX_4^-$ (where X is halogen), $GaX_4^-$ (where X is halogen), $Al(R)_tX_{4-t}$ where R is alkyl of 1–12 carbon atoms where t is 0–4, $SbF_6^-$, $[CuCl_2]^-$, $AsF_6^-$, $SO_4^-$, $CF_3CH_2CH_2COO^-$, $(CF_3SO_2)_3C^-$, $CF_3(CF_2)_3SO_3^-$, $[CF_3SO_2]_2N^-$. Preferably $B^-$ will be selected from $Cl^-$, $CF_3SO_3^-$, $CF_3COO^-$, $BF_4^-$, $PF_6^-$, $CF_3(CF_2)_3SO_3^-$, and $[CF_3SO_2]_2N^-$.

$A^+$ will preferably be selected from:

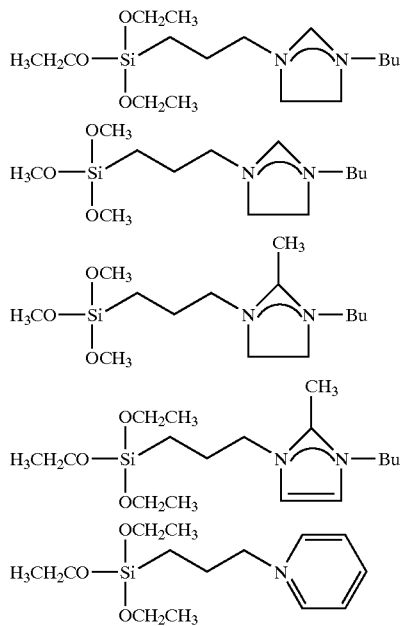

Most preferably A will be selected from

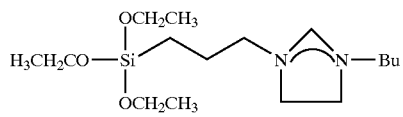

In the formulae depicted earlier for A, p=an integer from 1–4, preferably 1 or 2, r is an integer from 0 to 10, preferably 1 or 2, 1, 1', and 1" are integers from 0 to 4, preferably 1, and each of 1, 1', and 1" can be different.

For example, to prepare the composition A⁺B⁻ shown below

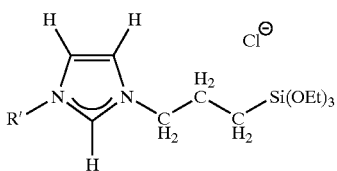

The skilled artisan could react

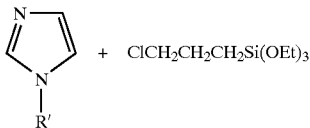 + ClCH₂CH₂CH₂Si(OEt)₃

The Cl⁻ could then be ion exchanged with NaPF₆ if desired, yielding A⁺B⁻ with B as either Cl or PF₆. This is an example of reacting a neutral nitrogen containing compound with a lone electron pair on the nitrogen with an electrophile having a silicon based anchor group where the silicon based anchor group is Si-alkoxy.

Alternatively, the skilled artisan could react an alkylating electrophile such as butyl chloride with a neutral nitrogen containing compound having a silicon based anchor group as shown below.

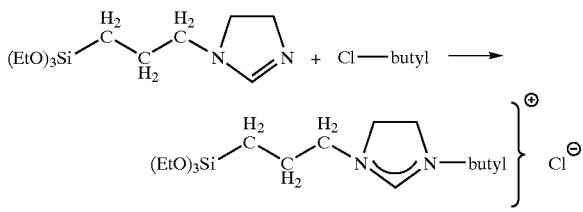

The chloride complex can then be exchanged with NaPF₆ in the presence of acetonitrile to replace the Cl⁻ with PF₆⁻ if desired. Prior to exchanging the chloride anion, the compound is preferably evaporated to remove excess butyl chloride. Such a work up procedure is common to the skilled artisan. Further, the compound may then be washed with a non-polar organic solvent such as pentane and dried. The butyl chloride above is referred to as the alkylating agent and the silicon containing ethoxy group as the anchoring group herein which allows the composition A⁺B⁻ to be covalently bonded through A to a support. Alkylating groups other than butyl groups can be introduced accordingly. Refluxing is typically carried out at temperatures up to about 200° C., preferably about 55 to about 200, more preferably 55 to 140, even more preferably about 60 to 100 and most preferably about 70 to 90° C. Although the reaction can be run at temperatures of up to 200° C., it is preferable not to exceed 140° C. since degradation will take place and yields will be lower.

In order to provide reaction temperatures which do not exceed 140° C., a solvent can be used. For example, 1,1,1-trichloroethane provides lower boiling (~100° C.) for the introduction of hexyl or octyl chloride in the alkylation process.

In the above formula for A⁺B⁻
B⁻=Cl⁻ or PF₆⁻ if ion exchange with PF₆⁻ has been conducted and A is

where R'=CH₂CH₂CH₂ and the other R is butyl and r and p both=1 and where the ring system

contains two nitrogen and is a five member ring.
Y=(OEt) and
m=0 and n=3.

The supports utilizable in the invention include both organic and inorganic supports including inorganic oxides and polymers. The supports may be selected from, for example, zeolites, clays, silica, alumina, silica-alumina or any other inorganic oxides having hydroxyl or surface oxygen groups.

By surface oxygen groups is meant an oxygen group bound to the surface of the support which can be reacted with the compound A⁺B⁻, of the above formula and thereby covalently bond through the cation of said A⁺B⁻.

The polymeric supports will preferably have the capability to bond to the composition A⁺B⁻ described above through the cation via a Carbon-Carbon bond using a hydrosilylation reaction.

When it is desired to covalently bond the composition A⁺B⁻, to a support, the skilled artisan may conduct a condensation reaction, a ring opening reaction or a hydrosilylation reaction. The skilled artisan will readily know which reaction to conduct depending on the composition A⁺B⁻ and the support selected. For example, for the support depicted below, the skilled artisan would readily recognize that a ring opening reaction would be conducted to covalently bond the support to the compound A⁺B⁻. In the example depicted below, only the SiZ portion of A⁺ is shown where Z is an ethoxy group (Hence Y=OEt, n=3, m=0). In the ring opening reaction, the surface oxygen present bonds covalently

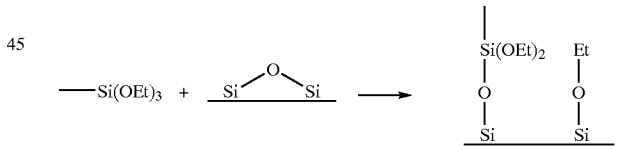

to the Si group of A while the OEt group bonds to the Si on the surface of the support. Such a reaction can be carried out in a solution of, for example heptane or toluene and a temperature of about 60 to about 150, preferably about 60 to about 100° C., and most preferably about 80° C. to form the surface bound species.

It is preferred to heat the support under vacuum at elevated temperatures of about 60 to about 600, preferably about 60 to about 400° C., and most preferably about 300° C. before surface immobilization (or covalent bonding) of A⁺B⁻ thereto. Heating removes adsorbed water and or volatile hydrolyzable species.

In a further reaction, a second and third ethoxy group can react with the support, either through a condensation reaction, or another ring opening reaction. In the most common case, the silicon atom of A is covalently attached to the surface of the support through 2 Si$_{(of A)}$—O—Si$_{(of support)}$ bonds with the third ethoxy group on the silicon atom remaining unreacted. For example:

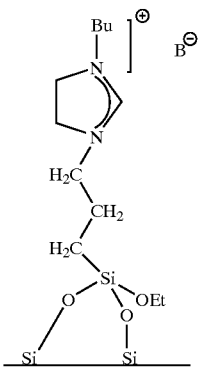

An example of a condensation reaction to covalently bond A⁺B⁻ to a support is

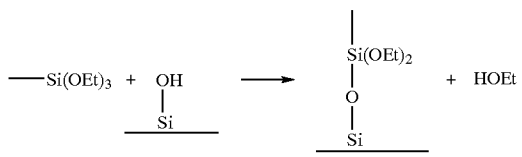

The above reaction is conducted at about 60 to about 200, preferably about 60 to about 100° C., and most preferably about 80° C.

An example of bonding A⁺B⁻ to a polymeric support is:

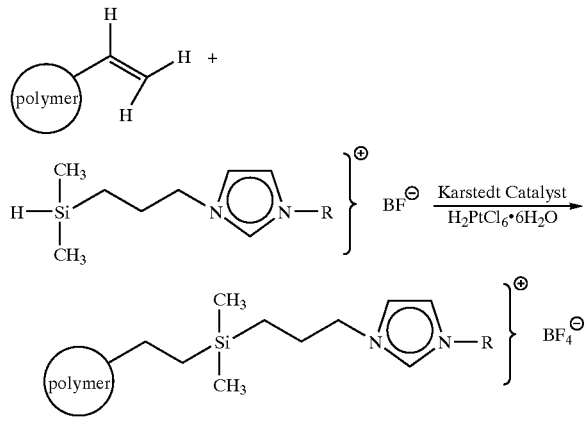

It is understood that in the above examples of bonding of A⁺B⁻ to the various supports that the reaction between only one molecule is being depicted. The above hydrosilylation reaction is conducted with the well-known Karstedt catalyst. For example $H_2PtCl_6 \cdot 6H_2O$ can be used. One skilled in the art will readily recognize that in view of the chemistry occurring to covalently bond the compound A⁺B⁻ to a support, A⁺B⁻ may not exist as such, but will exist as the compound of the result of the covalent bonding. Clearly, the skilled artisan recognizes that, if a condensation reaction occurs, water, alcohol, HX, etc., will be lost from the joining of the support to the compound A⁺B⁻.

In a ring opening reaction, the compound A⁺B⁻ merely adds to the support across the surface and nothing is lost. In a hydrosilylation reaction, the double bond merely becomes hydrogenated and no leaving groups are present. A carbon-carbon bond is formed.

Following the covalent bonding of A⁺B⁻ to the desired support, an additional ionic liquid may be added to the supported composition. To achieve this, the skilled artisan needs merely to dissolve the ionic liquid of choice in a solvent and mix it with the supported composition. The solvent is then evaporated off. While the solvent is evaporated, the non-volatile ionic liquid concentrates within A⁺B⁻ and is colombically attached thereto. The skilled artisan can readily determine which solvents to utilize by evaluating their compatibility with the supported composition and the ionic liquid. For example [bmin][BF₄] where bmin is 3-butyl-1-methylimidizolium readily dissolves in acetonitrile. Evaporation will likewise be conducted at conditions that will not decompose the final composition. For example, air drying or controlled heating may be utilized or evaporation under reduced pressure. The additional ionic liquid referred to herein can be any ionic liquid known to the skilled artisan or alternatively may also be an additional amount of a modified ionic liquid A⁺B⁻ described herein.

The ionic liquids which can be utilized and which may form a part of the compositions described herein, which are immobilized within the composition A⁺B⁻ are any ionic liquid known in the art and mixtures thereof. Examples include those described in P. Bouhote, et al. Inorg. Chem. 1996, 35, 1168–1178 and R. Hagiwara, J. Fluorine Chem. 2000, 105, 221–227.

Following the addition of the ionic liquid, or simultaneous therewith, a catalytically active material can be added to the composition. The catalytic material will associate with the composition through coulombic interaction and will be present within and incorporated within the ionic liquid. The catalyst present may be present as a precursor which is then converted to active catalyst in situ in the process in which the composition is used. The catalyst or precursor utilized herein can be a homogeneous, heterogeneous or biocatalyst or catalyst precursor.

Typically, up to 100 wt % of ionic liquid based on the weight of the supported A⁺B⁻ may be immobilized and coulombically attached to said A⁺B⁻, preferably about 50 wt % to about 10 wt %, more preferably about 25 wt % to about 1 wt % ionic liquid will be present in the composition. When a catalytic material, such as a catalyst or catalyst precursor is also present in the composition, it will be present in amounts of up to the solubility limit of the catalyst in the ionic liquid. Typically about 0.01 to about 1 wt % based on the weight of the composition will be present.

It is also possible for the ionic liquid colombically attached to the supported A⁺B⁻ to act as a catalyst such as for immobilized chloroaluminate ionic liquid phase [bmin][Al₂Cl₇] which can be a highly acidic catalytic medium.

The compositions of the formula A⁺B⁻ when covalently bonded to a support material are preferably present as a monolayer. As used herein a monolayer may include a partial monolayer. It is sufficient that any amount of A⁺B⁻ be covalently bonded to the surface of the support. However, preferably at least about 50% of the surface of the support will have a monolayer thereon and most preferably at least about 90%.

The following examples are meant to be illustrative and are not meant to be limiting.

EXAMPLES

Materials 1-chlorobutane, diethyl ether, pentane, chloroform, methylene chloride, acetonitrile, sodium tetrafluoroborate, silica gel (60–200 mesh) was degassed under reduced pressure (10⁻² torr) and heated to 300° C. for 6 hours prior to use (BET surface area 474 m²/g), (Aldrich); N-(3-triethoxysilylpropyl)-4,5-dihydroimidazol (Gelest); 1-butyl-3-methyl imidazolium chloride (Elementis). All chemicals were used as received unless otherwise stated.

Instrumentation

Standard Schlenk procedures and glove box techniques were used for all syntheses and sample manipulations. The solution NMR spectra, $^1$H and $^{13}$C, were recorded in dry deoxygenated chloroform-d and acetonitrile-d$_3$ on a Varian Unity 400 spectrometer. Chemical shifts were referenced to an internal standard (tetramethylsilane). Infrared spectra were measured with a Jasco FT/IR-620 FT-IR spectrometer. BET surface area analysis was performed a Micromeritics ASAP 2400. Galbraith Laboratory performed elemental analyses.

Example 1

1-(butyl)-3-(3-triethoxysilylpropyl)-4,5-dihydroimidazolium chloride (2)

A mixture of N-(3-triethoxysilylpropyl)-4,5-dihydroimidazol (13.7 g, 0.05 mol) and 1-chlorobutane (13.9 g, 0.15 mol) were refluxed at 78° C. for 21 hrs. The reaction mixture was cooled to room temperature and the volatiles evaporated under reduced pressure ($10^{-2}$ torr). The resulting material consisted of a brown colored paste, which was washed with pentane (3×100 ml). After drying the residue under reduced pressure ($10^{-2}$ torr) a yellow solid of complex (2) was obtained in 99% yield. $^1$H NMR (CDCl$_3$) 0.60 (m, 2H, $^3$J=7.0, CH$_2$—C$\underline{\text{H}}_2$—Si), 0.96 (tr, 3H, $^3$J=7.4, —CH$_2$—CH$_2$—C$\underline{\text{H}}_3$), 1.22 (tr, 9H, $^3$J=7.0, C$\underline{\text{H}}_3$—CH$_2$—O), 1.38 (six, 2H, $^3$J=7.4, —CH$_2$—C$\underline{\text{H}}_2$—CH$_3$), 1.68 (m, 2H, Si—CH$_2$—C$\underline{\text{H}}_2$—), 1.76 (m, 2H, —C$\underline{\text{H}}_2$—CH$_2$—CH$_3$), 3.65 (m, 4H, Si—CH$_2$—CH$_2$—C$\underline{\text{H}}_2$—N and —N—C$\underline{\text{H}}_2$—CH$_2$—N—Bu), 3.82 (qr, 6H, C$\overline{\text{H}}_3$—C$\underline{\text{H}}_2$—O), 4.04 (m, 4H, —N—C$\underline{\text{H}}_2$—CH$_2$—CH$_2$—CH$_3$ and —N—CH$_2$—C$\underline{\text{H}}_2$—N—Bu), 10.01 (s, 1H, N—C$\underline{\text{H}}$—N) ppm; $^{13}$C NMR (CDCl$_3$) 7.32 (1C, Si—$\underline{\text{C}}$H$_2$—CH$_2$—), 13.58 (1C, —CH$_2$—CH$_2$—$\underline{\text{C}}$H$_3$), 18.33 (3C, $\underline{\text{C}}$H$_3$—CH$_2$—O—), 19.63 (1C, —CH$_2$—$\underline{\text{C}}$H$_2$—CH$_3$), 21.27 (1C, Si—CH$_2$—$\underline{\text{C}}$H$_2$—), 29.36 (1C, —$\underline{\text{C}}$H$_2$—CH$_2$—CH$_3$), 48.01, 48.21, 48.51, 50.37 (4C, —$\underline{\text{C}}$H$_2$—N—$\underline{\text{C}}$H$_2$—CH$_2$—N—$\underline{\text{C}}$H$_2$—), 58.53 (3C, CH$_3$—$\underline{\text{C}}$H$_2$—O—), 158.87 (1C, N—$\underline{\text{C}}$H—N) ppm; MS/ES$^+$ (m/e) 331 [M$^+$], Anal. Calcd for C$_{16}$H$_{35}$N$_2$ClO$_3$Si: C, 52.37; H, 9.61; N, 7.63; Cl, 9.66; Si, 7.65. Found: C, 51.64; H, 9.94; N, 7.60; Cl, 13.61; Si, 7.65.

Example 2

1-(butyl)-3-(3-triethoxysilylpropyl)-4,5-dihydroimidazolium tetrafluoroborate (3).

The complex 1-(butyl)-3-(3-triethoxysilylpropyl)-4,5-dihydroimidazolium chloride (2) (10 g, 28.0 mmol) was dissolved in acetonitrile (200 ml) and treated with one equivalent of sodium tetrafluoroborate (3.1 g, 28.0 mmol). The resulting slurry was stirred for 5 days at room temperature. After the removal of the precipitate by filtration the volatiles were evaporated under reduced pressure ($10^{-2}$ torr) to give a brown liquid of complex (3) in 99% yield. $^1$H NMR (CD$_3$CN) 0.50 (m, 2H, $^3$J=7.0, CH$_2$—C$\underline{\text{H}}_2$—Si), 0.86 (tr, 3H, $^3$J=7.4, —CH$_2$—CH$_2$—C$\underline{\text{H}}_3$), 1.11 (tr, 9H, $^3$J=7.0, C$\underline{\text{H}}_3$—CH$_2$—O), 1.26 (six, 2H, $^3$J=7.4, —CH$_2$—C$\underline{\text{H}}_2$—CH$_3$), 1.54 (m, 2H, Si—CH$_2$—C$\underline{\text{H}}_2$—), 1.62 (m, 2H, —C$\underline{\text{H}}_2$—CH$_2$—CH$_3$), 3.38 (m, 4H, Si—CH$_2$—CH$_2$—C$\underline{\text{H}}_2$—N and —N—C$\underline{\text{H}}_2$—CH$_2$—N—Bu), 3.72 (qr, 6H, C$\overline{\text{H}}_3$—C$\underline{\text{H}}_2$—O), 4.84 (m, 4H, —N—C$\underline{\text{H}}_2$—CH$_2$—CH$_2$—CH$_3$ and —N—CH$_2$—C$\underline{\text{H}}_2$—N—Bu), 8.20 (s, 1H, N—C$\underline{\text{H}}$—N) ppm; $^{13}$C NMR (CD$_3$CN) 8.47 (1C, Si—$\underline{\text{C}}$H$_2$—CH$_2$—)$^-$, 14.81 (1C, —CH$_2$—CH$_2$—$\underline{\text{C}}$H$_3$), 19.53 (3C, $\underline{\text{C}}$H$_3$—CH$_2$—O—), 20.98 (1C, —CH$_2$—$\underline{\text{C}}$H$_2$—CH$_3$), 22.44 (1C, Si—CH$_2$—$\underline{\text{C}}$H$_2$—), 30.54 (1C, —$\underline{\text{C}}$H$_2$—CH$_2$—CH$_3$), 49.09, 49.73, 49.89, 51.58 (4C, —$\underline{\text{C}}$H$_2$—N—$\underline{\text{C}}$H$_2$—CH$_2$—N—$\underline{\text{C}}$H$_2$—), 59.90 (3C, CH$_3$—$\underline{\text{C}}$H$_2$—O—), 159.09 (1C, N—$\underline{\text{C}}$H—N) ppm; FT-IR (KBr) 3087 w, 2973 s, 2929 s, 2880 s, 1658 s, 1524 m, 1449 m, 1388 s, 1303 m, 1255 m, 1080 br, 957 m, 787 s cm$^{-1}$; MS/ES$^+$ (m/e) 331 [M$^+$]. Anal. Calcd. for C$_{16}$H$_{35}$N$_2$BF$_4$O$_3$Si: C, 45.94; H, 8.43; N, 6.70; B, 2.58; F, 18.16. Found: C, 45.95; H, 8.52; N, 7.34; B, 2.24; F, 17.86.

Example 3

1-(butyl)-3-(3-triethoxysilylpropyl)-4,5-dihydroimidazolium hexafluorophosphate (4)

The complex 1-(butyl)-3-(3-triethoxysilylpropyl)-4,5-dihydroimidazolium chloride (2) (25.07 g, 68.0 mmol) was dissolved in acetonitrile (200 ml) and treated with one equivalent of sodium hexafluorophosphate (11.49 g, 68.0 mmol). The resulting slurry was stirred for 5 days at room temperature. After the removal of the precipitate by filtration through a bed of Celite the volatiles were evaporated under reduced pressure ($10^{-2}$ torr) to give a brown liquid of complex (3) in 82% yield. $^1$H NMR (CD$_3$CN) 0.59 (m, 2H, CH$_2$—C$\underline{\text{H}}_2$—Si), 0.93 (m, 3H, —CH$_2$—CH$_2$—C$\underline{\text{H}}_3$), 1.19 (m, 9H, C$\underline{\text{H}}_3$—CH$_2$—O), 1.33 (m, 2H, CH$_2$—C$\underline{\text{H}}_2$—CH$_3$), 1.61 (m, 2H, Si—CH$_2$—C$\underline{\text{H}}_2$—), 1.70 (m, 2H, —C$\underline{\text{H}}_2$—CH$_2$—CH$_3$), 3.41 (m, 4H, Si—CH$_2$—CH$_2$—C$\underline{\text{H}}_2$—N and —N—C$\underline{\text{H}}_2$—CH$_2$—N—Bu), 3.80 (m, 6H, C$\overline{\text{H}}_3$—C$\underline{\text{H}}_2$—O), 3.88 (m, 4H, —N—C$\underline{\text{H}}_2$—CH$_2$—CH$_2$—CH$_3$ and —N—CH$_2$—C$\underline{\text{H}}_2$—N—Bu), 7.83 (s, 1H, N—C$\underline{\text{H}}$—N) ppm; $^{13}$C NMR (CD$_3$CN) 7.50 (1C, Si—$\underline{\text{C}}$H$_2$—CH$_2$—), 13.63 (1C, —CH$_2$—CH$_2$—$\underline{\text{C}}$H$_3$), 18.57 (3C, $\underline{\text{C}}$H$_3$—CH$_2$—O—), 19.92 (1C, —CH$_2$—$\underline{\text{C}}$H$_2$—CH$_3$), 21.41 (1C, Si—CH$_2$—$\underline{\text{C}}$H$_2$—), 29.41 (1C, —$\underline{\text{C}}$H$_2$—CH$_2$—CH$_3$), 48.25, 48.79, 48.94, 50.69 (4C, —$\underline{\text{C}}$H$_2$—N—$\underline{\text{C}}$H$_2$—CH$_2$—N—$\underline{\text{C}}$H$_2$—), 58.91 (3C, CH$_3$—$\underline{\text{C}}$H$_2$—O—), 157.57 (1C, N—$\underline{\text{C}}$H—N) ppm; Anal. Calcd. for C$_{16}$H$_{34}$N$_2$F$_6$PO$_3$Si: C, 40.47; H, 7.22; N, 5.90; F, 23.87; Si, 5.91. Found: C, 39.90; H, 7.23; N, 6.62; F, 22.15; Si, 5.68.

Example 4

1-(butyl)-3-(3-triethoxysilylpropyl)-4,5-dihydroimidazolium bis(trifluoromethane-sulfone)-amid (5)

The complex 1-(butyl)-3-(3-triethoxysilylpropyl)-4,5-dihydroimidazolium chloride (2) (25.16 g, 68.7 mmol) was dissolved in acetonitrile (200 ml) and treated with one equivalent of lithium bis(trifluoromethanesulfone) amid (19.7 g, 68.7 mmol). The resulting slurry was stirred for 3 days at room temperature. After the removal of the precipitate by filtration through a bed of Celite the volatiles were evaporated under reduced pressure ($10^{-2}$ torr) to give a brown liquid of complex (3) in 91% yield. $^1$H NMR (CD$_3$CN) 0.57 (m, 2H, CH$_2$—C$\underline{\text{H}}_2$—Si), 0.93 (m, 3H, —CH$_2$—CH$_2$—C$\underline{\text{H}}_3$), 1.19 (m, 9H, C$\underline{\text{H}}_3$—CH$_2$—O), 1.34 (m, 2H, CH$_2$—C$\underline{\text{H}}_2$—CH$_3$), 1.60 (m, 2H, Si—CH$_2$—C$\underline{\text{H}}_2$—), 1.69 (m, 2H, —C$\underline{\text{H}}_2$—CH$_2$—CH$_3$), 3.40 (m, 4H, Si—CH$_2$—CH$_2$—CH$_2$—N and —N—C$\underline{\text{H}}_2$—CH$_2$—N—Bu), 3.81 (m, 6H, CH$_3$—C$\underline{\text{H}}_2$—O), 3.87 (m, 4H, —N—C$\underline{\text{H}}_2$—CH$_2$—CH$_2$—CH$_3$ and —N—CH$_2$—C$\underline{\text{H}}_2$—N—Bu), 7.87 (s, 1H, N—C$\underline{\text{H}}$—N) ppm; $^{13}$C NMR (CD$_3$CN) 8.58 (1C, Si—$\underline{\text{C}}$H$_2$—CH$_2$—), 14.48 (1C, —CH$_2$—CH$_2$—$\underline{\text{C}}$H$_3$), 19.46 (3C, $\underline{\text{C}}$H$_3$—CH$_2$—O—), 20.93 (1C, —CH$_2$—$\underline{\text{C}}$H$_2$—CH$_3$), 22.50 (1C, Si—CH$_2$—$\underline{\text{C}}$H$_2$—), 30.57 (1C, —$\underline{\text{C}}$H$_2$—CH$_2$—CH$_3$), 49.37, 49.94, 50.09, 51.77 (4C, —$\underline{\text{C}}$H$_2$—N—$\underline{\text{C}}$H$_2$—CH$_2$—N—$\underline{\text{C}}$H$_2$—), 59.94 (3C, CH$_3$—$\underline{\text{C}}$H$_2$—O—), 121.74 (qr, 2C, $\underline{\text{C}}$F$_3$—), 158.58 (1C, N—$\underline{\text{C}}$H—N) ppm; Anal. Calcd. for C$_{18}$H$_{34}$N$_3$F$_6$O$_7$SiS$_2$: C, 35.40; H, 5.61; N, 6.88; F, 18.67; Si, 4.60; S, 10.50. Found: C, 35.22; H, 5.61; N, 7.44; F, 17.93; Si, 4.43; S, 10.71.

Example 5

1-(butyl)-3-(3-triethoxysilylpropyl)-4,5-dihydroimidazolium chloride anchored on silica gel (6)

The complex 1-(butyl)-3-(3-triethoxysilylpropyl)-4,5-dihydroimidazolium chloride (2) (4.0 g, 10.9 mol) was dissolved in chloroform (300 ml) and treated with silica gel (40.0 g). After heating the slurry under reflux condition for 16 hrs the solid was isolated by filtration. Washing of the resulting material with diethyl ether (100 ml) and drying under reduced pressure ($10^{-2}$ torr) gave a slightly yellow powder. BET surface area: 435 $m^2$/g. Anal. Found: C, 5.24; H, 1.40; N, 0.70; Cl, 1.13.

Example 6

1-(butyl)-3-(3-triethoxysilylpropyl)-4,5-dihydroimidazolium tetrafluoroborate anchored on silica gel (7)

The complex 1-(butyl)-3-(3-triethoxysilylpropyl)-4,5-dihydroimidazolium tetrafluoroborate (3) (2.0 g, 4.8 mmol) was dissolved in chloroform (50 ml) and treated with silica gel (3.0 g). After heating the slurry under reflux condition for 24 hrs the solid was isolated by filtration and washed with pentane (50 ml). Additional washings were carried out with acetonitrile (100 ml) and diethyl ether (100 ml) before the material was dried under reduced pressure ($10^{-2}$ torr) to give a slightly yellow powder. To remove trace amounts of complex (3) from the resulting solid a soxhlet extraction was carried out with acetonitrile and diethyl ether, respectively. The resulting material was dried under reduced pressure ($10^{-2}$ torr) to give a slightly yellow powder. $^{13}$C NMR (solid state) 11.2 (1C, $\underline{C}H_3$—$CH_2$—O—), 13.7 (1C, $\underline{C}H_3$—$CH_2$—$CH_2$—), 19.4 (3C, Si—$\underline{C}H_2$—$\underline{C}H_2$—$CH_2$—, $CH_3$—$\underline{C}H_2$—$CH_2$—), 29.1 (1C, $CH_3$—$CH_2$—$\underline{C}H_2$—), 48.1 (4C, —$\underline{C}H_2$—$\underline{C}H_2$—$\underline{C}H_2$—N—$\underline{C}H_2$), 59.2 ($CH_3$—$\underline{C}H_2$—O—), 157.9 (1C, N—$\underline{C}H$—N) ppm; FT-IR (Photoacoustic) 3097 w, 2967 m, 2928 m, 2887 m, 1876 m, 1786 m, 1655 s, 1525 w, 1458 m, 1196 s, 1130 s, 802 s $cm^{-1}$. Anal. Found.: C, 5.39; H, 1.32; N, 0.78; B, 0.18; F, 0.57.

Example 7

1-(butyl)-3-(3-triethoxysilylpropyl)-4,5-dihydroimidazolium hexafluorophosphate anchored on silica gel (8)

The complex 1-(butyl)-3-(3-triethoxysilylpropyl)-4,5-dihydroimidazolium hexafluorophosphate (4) (4.0 g, 8.4 mmol) was dissolved in chloroform (200 ml) and treated with silica gel (40.0 g). After heating the slurry under reflux condition for 18 hrs the solid was isolated by filtration and washed with diethylether (3×50 ml). The resulting material was dried under reduced pressure ($10^{-2}$ torr) to give a slightly yellow powder. Anal. Found.: C, 5.61; H, 1.42; N, <0.5; F, 1.26; P, 0.51.

Example 8

1-(butyl)-3-(3-triethoxysilylpropyl)-4,5-dihydroimidazolium bis(trifluoromethane-sulfone) amid anchored on silica gel (9)

The complex 1-(butyl)-3-(3-triethoxysilylpropyl)-4,5-dihydroimidazolium bis(trifluoromethanesulfone) amid (5) (4.0 g, 6.5 mmol) was dissolved in chloroform (200 ml) and treated with silica gel (40.0 g). After heating the slurry under reflux condition for 20 hrs the solid was isolated by filtration and washed with diethylether (3×50 ml). The resulting material was dried under reduced pressure ($10^{-2}$ torr) to give a slightly yellow powder. Anal. Found.: C, 4.44; H, 1.20; N, 0.66; F, 1.38; S, 1.01.

Example 9

1-(butyl)-3-(3-triethoxysilylpropyl)-4,5-dihydroimidazolium tetrafluoroborate (3) anchored on the surface of MCM-41 (10)

The mesoporous MCM-41 material was degassed at 300° C. under vacuum ($10^{-2}$ torr) for 3 h prior to use. The complex 1-(butyl)-3-(3-triethoxysilylpropyl)-4,5-dihydroimidazolium tetrafluoroborate (3) (1.9 mmol, 0.8 g) was dissolved in $CHCl_3$ (100 ml) and treated with MCM-41 (BET surface area: 1018 $m^2$/g; BJH desorption average pore diameter 31.6 Å) material (1.5 g). After heating the slurry under reflux condition overnight the solid was isolated by filtration and washed with diethylether (50 ml). The resulting material was dried under reduced pressure ($10^{-2}$ torr) to give a slightly yellow powder. BET surface area: 716 $m^2$/g; BJH desorption average pore diameter 27.4 Å.

Example 10

1-(butyl)-3-(3-triethoxysilylpropyl)-4,5-dihydroimidazolium aluminum chloride anchored on silica gel (11)

The solid 1-(butyl)-3-(3-triethoxysilylpropyl)-4,5-dihydroimidazolium chloride anchored on silica gel (6) was treated with toluene solution of aluminum chloride. The complex aluminum chloride (2.7 mmol, 360 mg) was loaded in a soxhlet thimble and extracted into a slurry of the complex (6) (5 g) in toluene (200 ml). After the slurry was refluxed overnight the resulting material was filtered and dried under reduced pressure ($10^{-2}$ torr).

Example 11

1-(butyl)-3-(3-triethoxysilylpropyl)-4,5-dihydroimidazolium tetrafluoroborate (3) anchored on silica gel (7) and treated with 3-butyl-1-methylimidazolium tetrafluoroborate and catalyst precursors to form the catalytic material (12)

The complex dicarbonylacetylacetonate rhodium (0.01 mmol, 3 mg) and tris(3-sulfonatophenyl) phosphine 3-butyl-1-methylimidazolium salt (0.1 mmol, 68.5 mg) were dissolved in acetonitrile (3 ml). To this solution was added the ionic liquid 3-butyl-1-methylimidazolium tetrafluoroborate (1.5 g) to give a clear yellow solution. The resulting mixture was treated with the solid of 1-(butyl)-3-(3-triethoxysilylpropyl)-4,5-dihydroimidazolium tetrafluoroborate anchored on silica gel (6) (3 g). After stirring the mixture for a brief period the volatile organic components of the slurry were evaporated under reduced pressure ($10^{-2}$ torr) to give a free flowing powder with a slight yellow coloration.

Example 12

1-(butyl)-3-(3-triethoxysilylpropyl)-4,5-dihydroimidazolium hexafluorophosphate (4) anchored on silica gel (8) and treated with 3-butyl-1-methylimidazolium hexafluorophosphate and catalyst precursors to form the catalytic material (13)

The complex dicarbonylacetylacetonate rhodium (0.01 mmol, 3 mg) and tris(3-sulfonatophenyl)phosphine 3-butyl-1-methylimidazolium salt (0.1 mmol, 68.5 mg) were dissolved in acetonitrile (3 ml). To this solution was added the ionic liquid 3-butyl-1-methylimidazolium hexafluorophosphate (1.5 g) to give a clear yellow solution. The resulting mixture was treated with the solid of 1-(butyl)-3-(3-triethoxysilylpropyl)-4,5-dihydroimidazolium tetrafluoroborate anchored on silica gel (7) (3 g). After stirring the mixture for a brief period the volatile organic components of the slurry were evaporated under reduced pressure ($10^{-2}$ torr) to give a free flowing powder with a slight yellow coloration.

Example 13

1-(butyl)-3-(3-triethoxysilylpropyl)-4,5-dihydroimidazolium bis(trifluoromethane-sulfone) amid (5) anchored on silica gel (9) and treated with 3-butyl-1-methylimidazolium bis(trifluoromethane-sulfone) amid and catalyst precursors to form the catalytic material (14)

The complex (cyclo-hexyl)-bis(3-sulfonatophenyl) phosphine sodium salt (0.3 mmol, 153 mg) and 3-butyl-1-methylimidazolium chloride (0.3 mmol, 53 mg) were dissolved in the ionic liquid 3-butyl-1-methylimidazolium bis(trifluoromethane-sulfone) amid (2.25 g) and methylene chloride (0.75 g). After stirring for 1 h the slurry is filtered to give a clear solution. The resulting solution was investigated by $^{31}$P NMR to reconfirm the presence of the phosphine ligand. A fraction of the phosphine containing solution (1 g, 0.1 mmol phosphine ligand) was treated with the complex dicarbonylacetylacetonate rhodium (0.01 mmol, 3 mg) to give a clear yellow liquid. The resulting mixture was treated with the solid of 1-(butyl)-3-(3-triethoxysilylpropyl)-4,5-dihydroimidazolium bis(trifluoromethane-sulfone) amid anchored on silica gel (9) (3 g). After stirring the mixture for a brief period the volatile organic components of the slurry were evaporated under reduced pressure ($10^{-2}$ torr) to give a free flowing powder with a slight yellow coloration.

What is claimed is:

1. A composition comprising a support selected from the group consisting of organic and inorganic supports and a composition of the formula

wherein A is selected from the group consisting of compounds of the general formulae:

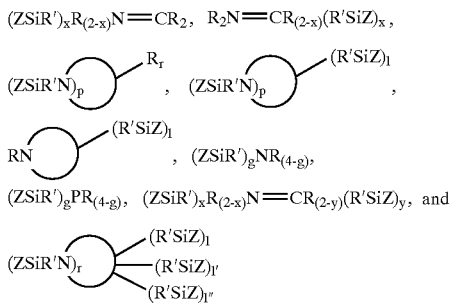

and wherein each occurrence of Z is independently selected from the formula

Where Y is OR or R

And wherein X is halide and wherein p is an integer from 1 to 4, r is an integer from 0 to 10, 1, 1' and 1" are integers from 0 to 4 wherein $1+1'+1"+p \leq 4$ n+m=3 and wherein n ranges from 0 to 3 and m ranges from 0 to 3 and wherein said cyclic systems (depicted by circles) contain 4 to 10 atoms in addition to one or more nitrogen atoms, and may also contain sulfur or oxygen atoms singly or double bonded to said ring and wherein said cyclic system may be a single, double or triple ring system and wherein B$^-$ is selected from the group consisting of salts, anions, alkylates and halogenated salts of the Group Ib, IIIb, IVb, Vb, VIb, VIIb, IIIa, IVa, Va, VIa, VIIa, and VIIIa elements of the periodic table and wherein g is an integer from 1 to 4, x is 1 or 2 and y is 1 or 2, wherein each R in the above formulae is independently selected from the group consisting of hydrogen, alkyl, aryl, cycloalkyl, aralkyl halogenated alkyl, halogenated aryl, halogenated aralkyl, halogenated aralkyl, oxygen, nitrogen, or sulfur substituted alkyl, oxygen, nitrogen or sulfur substituted aryl, oxygen, nitrogen or sulfur substituted cycloalkyl groups having from 1 to 12 carbon atoms and mixtures thereof, and wherein said compound having the formulae A$^+$B$^-$ is covalently bonded to said support through said A$^+$group.

2. The composition of claim 1 wherein an ionic liquid selected from the group consisting essentially of modified ionic liquids A$^+$B$^-$, ionic liquids, and mixtures thereof is coulombically bonded to said A$^+$B$^-$.

3. The composition of claim 2 wherein a catalyst or catalyst precursor is immobilized within said ionic liquid.

4. The composition of claim 2 wherein the amount of ionic liquid ranges from about 1:1 to about 1:100 ionic liquid:support.

5. The composition of claim 1 wherein at least 50% of said support has said A$^+$B$^-$ present as a monolayer.

6. The composition of claim 1 wherein said B is selected from the group consisting of BF$_4^-$, PF$_6^-$; NO$_3^-$, Cl$^-$, halogen$^-$, CF$_3$SO$_3^-$, CF$_3$COO$^-$, AlX$_4^-$ (where X is halogen), GaX$_4^-$ (where X is halogen), Al(R)$_t$X$_{4-t}$ where R is alkyl of 1–12 carbon atoms where t is 0–4, SbF$_6^-$, [CuCl$_2$]$^-$, AsF$_6^-$, SO$_4^-$, CF$_3$CH$_2$CH$_2$COO$^-$, (CF$_3$SO$_2$)$_3$C$^-$, CF$_3$(CF$_2$)$_3$SO$_3^-$, [CF$_3$SO$_2$]$_2$N$^-$.

7. The composition of claim 3 wherein said catalyst or catalyst precursor is a homogeneous catalyst, heterogeneous catalyst, biocatalyst or mixture thereof.

8. The composition of claim 3 wherein the amount of catalyst or catalyst precursor ranges up to the solubility limit of said catalyst or said catalyst precursor in said ionic liquid.

9. The composition of claim 2 wherein said ionic liquid is catalytically active.

10. A composition comprising:

(a) a support selected from the group consisting of organic and inorganic supports;

(b) a composition of the formula

wherein A is selected from the group consisting of compounds of the general formulae:

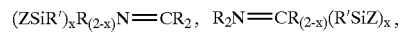
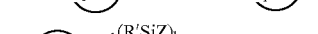
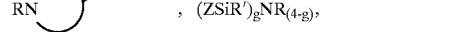
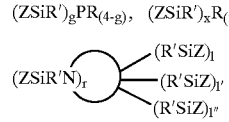

and wherein each occurrence of Z is independently selected from the formula

where Y is OR or R, and wherein X is halide and wherein p is an integer from 1 to 4, r is an integer from 0 to 10, 1, 1' and 1" are integers from 0 to 4 wherein $1+1'+1"+p \leq 4$, n+m=3 and wherein n ranges from 0 to 3 and m ranges from 0 to 3 and wherein said cyclic systems (depicted by circles) contain 4 to 10 atoms in addition to one or more nitrogen atoms, and may also contain sulfur or oxygen atoms a singly or double bonded to said ring and wherein said cyclic system may be a single, double or triple ring system and wherein B⁻ is selected from the group consisting of salts, anions, alkylates and halogenated salts of the Group Ib, IIIb, IVb, Vb, VIb, VIIb, IIIa, IVa, Va, VIa, VIIa, and VIIIa elements of the periodic table and wherein g is an integer from 1 to 4, x is 1 or 2 and y is 1 or 2, wherein each R in the above formulae is independently selected from the group consisting of hydrogen, alkyl, aryl, cycloalkyl, aralkyl, halogenated alkyl, halogenated aryl, halogenated aralkyl, halogenated aralkyl, oxygen, nitrogen, or sulfur substituted alkyl, oxygen, nitrogen or sulfur substituted aryl, oxygen, nitrogen or sulfur substituted aralkyl, oxygen, nitrogen or sulfur substituted cycloalkyl groups having from 1 to 12 carbon atoms and mixtures thereof, and wherein each R' in the above formulae is independently selected from the group consisting of alkyl, aryl, cycloalkyl, aralkyl, halogenated alkyl, halogenated aryl, halogenated alkyl, halogenated aralkyl, oxygen, nitrogen, or sulfur substituted alkyl, oxygen, nitrogen or sulfur substituted aryl, oxygen, nitrogen or sulfur substituted aralkyl, oxygen, nitrogen or sulfur substituted cycloalkyl groups having from 1 to 12 carbon atoms and mixtures thereof, and wherein said compound having the formulae A⁺B⁻ is covalently bonded to said support through said A⁺ group;

(c) an ionic liquid selected from the group consisting essentially of modified ionic liquids A⁺B⁻, ionic liquids and mixtures thereof is coulombically bonded to said A⁺B⁻; and (d) a catalyst or catalyst precursor immobilized within said ionic liquid, wherein the amount of the catalyst or catalyst precursor ranges from about 0.01 to about 1 wt % based on the weight of said composition.

11. The composition of claim 10 wherein said supports are selected from the group consisting of silica, polymers, zeolites, clays, alumina, and silica-alumina.

12. A composition comprising a support selected from the group consisting of organic and inorganic supports and a composition of the formula:

wherein said A+ is selected from the group consisting of

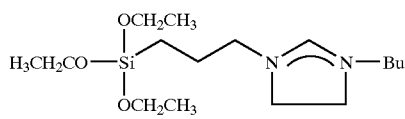

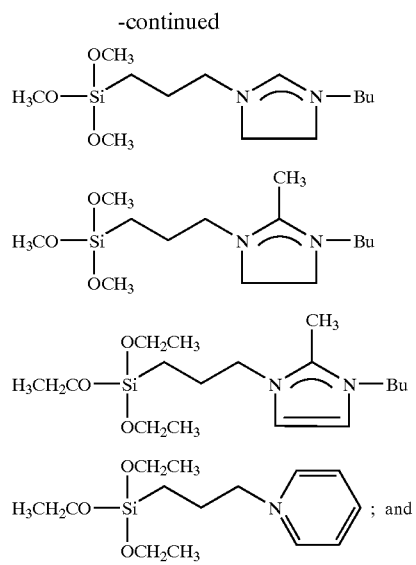

wherein B⁻ is selected from the group consisting of salts, anions, alkylates and halogenated salts of the Group Ib, IIIb IVb, Vb, VIb, VIIb, IIIa, IVa, Va, VIa, VIIa, and VIIIa elements of the periodic table, further wherein said compound having the formulae A⁺B⁻ is covalently bonded to said support through said A⁺ group.

13. A method of preparing a supported composition comprising:

covalently bonding a compound having the formula A⁺B⁻ to a support selected from organic and inorganic supports, wherein said composition A⁺B⁻ is covalently bonded to said support through A⁺ and wherein said composition A⁺B⁻ has the formulae shown above and wherein said covalent bond is established through a chemical reaction between said support and said compound, said chemical reaction being selected from the group consisting of condensation reactions, ring opening reactions, and hydrosilylation reactions which take place between said composition A⁺B⁻ and said support.

14. The method of claim 13 wherein an ionic liquid dissolved in a solvent is deposited onto said support and said solvent is thereafter evaporated.

15. The method of claim 14 wherein a catalyst or catalyst precursor is added to said solvent and deposited onto said support.

* * * * *